(12) United States Patent
Pineau et al.

(10) Patent No.: US 11,879,555 B2
(45) Date of Patent: Jan. 23, 2024

(54) ON/OFF SOLENOID VALVE PROVIDING TWO LEVELS OF MECHANICAL PRESSURE REGULATION

(71) Applicant: BONTAZ CENTRE R & D, Marnaz (FR)

(72) Inventors: Frédéric Daniel Bernard Pineau, Metz-Tessy (FR); Stéphane Pascal Perotto, Ayse (FR)

(73) Assignee: BONTAZ CENTRE, Marnaz (FR)

( * ) Notice: Subject to any disclaimer, the term of this patent is extended or adjusted under 35 U.S.C. 154(b) by 326 days.

(21) Appl. No.: 17/267,155

(22) PCT Filed: Aug. 9, 2019

(86) PCT No.: PCT/EP2019/071478
§ 371 (c)(1),
(2) Date: Feb. 9, 2021

(87) PCT Pub. No.: WO2020/030802
PCT Pub. Date: Feb. 13, 2020

(65) Prior Publication Data
US 2021/0310571 A1    Oct. 7, 2021

(30) Foreign Application Priority Data

Aug. 10, 2018 (FR) ..................... 1857461

(51) Int. Cl.
*F16K 11/07* (2006.01)
*F16K 31/06* (2006.01)
(Continued)

(52) U.S. Cl.
CPC ...... *F16K 11/0716* (2013.01); *F16K 31/0613* (2013.01); *F01M 1/16* (2013.01); *F01M 1/20* (2013.01)

(58) Field of Classification Search
CPC ...... F16K 31/0613; F16K 11/07; F15B 15/20; F01M 1/16; F01M 1/20
See application file for complete search history.

(56) References Cited

U.S. PATENT DOCUMENTS

| 3,888,278 A | 6/1975 | Hanks |
| 4,442,998 A | 4/1984 | Ohyama et al. |
| (Continued) | | |

FOREIGN PATENT DOCUMENTS

| DE | 102009006445 B3 | 7/2010 |
| DE | 102014219726 A1 | 9/2015 |
| (Continued) | | |

OTHER PUBLICATIONS

Search Report issued in French Patent Application No. 1857461 dated Apr. 4, 2019.

(Continued)

*Primary Examiner* — Kelsey E Cary
(74) *Attorney, Agent, or Firm* — Pearne & Gordon LLP (57) ABSTRACT

A solenoid valve device with a pressure-responsive slide mechanism, including: a body including at least three channels for flow of a liquid; a slide that can be moved in the body by a pressurised fluid, between a position with fluid communication between a first and a second channel among the three flow channels, and a position with fluid communication between the second channel and the third channel; a selector for selecting an activation threshold for movement of the slide, among at least one first and at least one second pressure threshold; and a regulator for regulating at least the activation thresholds of the slide.

26 Claims, 5 Drawing Sheets

(51) Int. Cl.
*F01M 1/16* (2006.01)
*F01M 1/20* (2006.01)

(56) References Cited

U.S. PATENT DOCUMENTS

| | | |
|---|---|---|
| 4,915,134 A | 4/1990 | Toliusis et al. |
| 5,092,365 A | 3/1992 | Neff |
| 6,102,668 A * | 8/2000 | Kawaguchi ......... F04B 27/1804 |
| | | 417/222.2 |
| 2001/0025662 A1 | 10/2001 | Kawamura et al. |
| 2006/0027269 A1 | 2/2006 | Neff et al. |
| 2008/0251748 A1 | 10/2008 | Neff et al. |
| 2009/0140192 A1 | 6/2009 | Yamamoto et al. |
| 2009/0224192 A1 | 9/2009 | Oikawa et al. |
| 2011/0297856 A1 | 12/2011 | Bill et al. |
| 2012/0048398 A1* | 3/2012 | Schudt ................ F16H 61/0251 |
| | | 137/514 |
| 2016/0103455 A1 | 4/2016 | Bowden |
| 2020/0200066 A1 | 6/2020 | Perotto et al. |
| 2021/0180715 A1* | 6/2021 | Hayama .................. F04B 49/22 |

FOREIGN PATENT DOCUMENTS

| | | |
|---|---|---|
| EP | 0845602 A2 | 6/1998 |
| EP | 2568204 A1 | 3/2013 |
| EP | 3098403 A1 | 11/2016 |
| JP | 2006049918 A | 2/2006 |
| JP | 2011524965 A | 9/2011 |
| JP | 2014178028 A | 9/2014 |
| KR | 20110107253 A | 9/2011 |
| WO | 2009155212 A2 | 12/2009 |

OTHER PUBLICATIONS

International Search Report for Application No. PCT/EP2019/071478 dated Aug. 28, 2019.
Written Opinion for PCT/EP2019/071478 dated Aug. 28, 2019.
Specification and drawings for US Patent Application titled "Captive Screw Spray Nozzle", U.S. Appl. No. 16/621,936, filed Dec. 12, 2019.
Office action for Japanese patent application No. 2021-506684 dated Oct. 16, 2023.

* cited by examiner

ON/OFF SOLENOID VALVE PROVIDING TWO LEVELS OF MECHANICAL PRESSURE REGULATION

This is the National Stage of PCT international application PCT/EP2019/071478, filed on Aug. 9, 2019 entitled "ON/OFF SOLENOID VALVE PROVIDING TWO LEVELS OF MECHANICAL PRESSURE REGULATION", which claims the priority of French Patent Application No. 1857461 filed Aug. 10, 2018, both of which are incorporated herein by reference in their entirety.

TECHNICAL DOMAIN AND PRIOR ART

The invention relates to a solenoid valve, for example of the ON/OFF type, providing 2 levels of mechanical pressure regulation, each of which can be regulated independently of the other.

This invention is applicable in particular to the control of engine oil pumps in vehicles in which it is directly or indirectly installed.

In some applications, ON/OFF solenoid valves are also known that have a mechanism with a slide not reactive to pressure, that do not have a mechanical pressure regulation threshold, or ON/OFF solenoid valves with a slide that is reactive to pressure with 2 regulation thresholds, in which neither threshold or only one threshold is variable.

Valves with a slide mechanism reactive to pressure but that have only one mechanical pressure regulation threshold are also known.

Proportional solenoid valves with a slide mechanism reactive to pressure with no or with only one adjustable threshold are also known. Furthermore, these solenoid valves also require an electrical control system capable of generating a variable current (for example PWM) and possibly equipment useful for management of a slaving loop.

It is required to find an ON/OFF solenoid valve type device, providing two adjustable regulation thresholds, particularly for oil pump applications, and especially in the automobile field.

BRIEF DESCRIPTION OF THE INVENTION

The invention relates firstly to a solenoid valve type device with a mechanism with a slide reactive to pressure comprising:
- a body comprising at least 3 liquid flow channels;
- means forming a slide that can be displaced in said body by a fluid under pressure, between a first position in which there is fluid communication between a first channel and a second channel among said 3 flow channels, and a second position in which there is fluid communication between said second channel and the $3^{rd}$ channel;
- means of selecting an activation pressure threshold for a displacement of said slide, among at least one first pressure threshold (Ph) and at least one second pressure threshold (Pb, in which Pb<Ph);
- means of regulating at least said first threshold (Ph) and at least said second threshold (Pb) for activation of said slide.

Thus, means that may be of the electromagnetic type may be used not only to select an activation pressure threshold of said slide among at least one first activation pressure threshold (Ph) and at least one second activation pressure threshold (Pb, in which Pb<Ph) of said slide, but also to regulate these thresholds. After selection of the pressure threshold, the slide can then be displaced by the fluid under pressure, if this fluid pressure is higher than the selected activation pressure threshold.

In a large scale production context, the invention can thus be used to minimise dispersion on the value of 2 mechanical regulation levels by using the possible regulation of the 2 thresholds to eliminate the effect of dispersion of dimensions of components in the assembly formed.

Such a device can be used as a solenoid valve installed in a pump type system, for example an oil pump, for example for an internal combustion engine, particularly in a moving vehicle, to control it.

According to one embodiment, a device according to the invention comprises:
- a first spring, that tends to hold the slide in the first position;
- an electromagnetic actuator;
- a mobile core that can be displaced inside the device using said electromagnetic actuator, between an inactive position and an active position (in one direction or the other), to select said activation pressure threshold of said slide, before said slide is activated by the fluid under pressure (if this pressure is higher than said selected activation pressure threshold).

The invention can then provide at least 2 mechanical pressure regulation levels that can be selected by activating and deactivating an electromagnetic actuator before activating the slide between the $1^{st}$ and the $2^{nd}$ position by the fluid under pressure.

According to one particular embodiment of a device according to the invention, the means of regulating one of the activation pressure thresholds may comprise means of regulating a longitudinal bearing force of the first spring on the slide.

For example, these means comprise a stop against which the spring bears, and a needle, inserted in the mobile core over a length L.

This length L can be adjustable and/or the device may also comprise means of regulating a pressure or deformation of said stop.

According to one particular embodiment of a device according to the invention, the means of regulating the other activation pressure threshold of said slide comprises means of regulating the inactive position of the mobile core inside the device.

The means of regulating the inactive position of said mobile core may comprise an element in adjustable bearing against said mobile core.

For example, such a device comprises a fixed core and a second spring placed between the fixed core and the mobile core, bearing of the element on said mobile core more or less compressing this second spring.

Said element in adjustable bearing against said mobile core may comprise an end plug of the device, for which the bearing may for example be regulated by screwing.

Such a device may comprise a fixed core and a second spring placed between the fixed core and the mobile core, and bearing, for example regulated by screwing, of the fixed core on said mobile core more or less compressing this second spring.

In a device according to the invention, the difference Ph—Pb between the two pressure regulation levels is preferably between 1 bar and 7 bars.

In one embodiment, a device according to the invention may also comprise means of supplying power to the electromagnetic actuator capable of generating a variable current, for example of the PWM type.

A device according to the invention may be of the type generating a thrust movement when the electromagnetic actuator is activated.

As a variant, a device according to the invention may be of the type generating a pulling movement when the electromagnetic actuator is activated.

The invention also relates to a hydraulic circuit, comprising a solenoid valve type device according to the invention.

The invention also relates to a pump, for example an oil pump, comprising said pump and a solenoid valve type device according to the invention.

The invention also relates to a method of operating a solenoid valve type device according to the invention, in which:
- if the activation pressure threshold of said slide is the first pressure threshold (Ph), a fluid is injected at a pressure P to displace said slide from the first position to the second position, the pressure P being greater than the first pressure threshold (Ph);
- if the activation pressure threshold of said slide is the second pressure threshold (Pb), a fluid is injected at a pressure P to displace said slide from the first position to the second position, the pressure P being greater than the second pressure threshold (Pb).

The invention also relates to a method of operating a solenoid valve type device according to the invention, in which:
- if the activation pressure threshold of said slide is the first pressure threshold (Ph), the mobile core is displaced inside the device using said electromagnetic actuator, to regulate the activation pressure to the second activation pressure threshold (Pb) of said slide;
- a fluid is injected at pressure P to displace said slide from the first position to the second position, the pressure P being greater than the second pressure threshold (Pb);

The invention also relates to a method of operating a solenoid valve type device according to the invention, in which:
- if the activation pressure threshold of said slide is the second pressure threshold (Pb), the mobile core is displaced inside the device using said electromagnetic actuator, to regulate the activation pressure to the first activation pressure threshold (Ph) of said slide;
- a fluid is injected at pressure P to displace said slide from the first position to the second position, the pressure P being greater than the first pressure threshold (Pb).

BRIEF DESCRIPTION OF THE DRAWINGS

An example embodiment of the invention will now be described with reference to the appended drawings among which:

FIGS. 4A-5B represent the application of one embodiment of a device according to the invention to an oil pump.

DETAILED DESCRIPTION OF EMBODIMENTS

The invention can be used to control opening and closing of the slide of a solenoid valve with two different pressure thresholds Pb (low pressure), Ph (high pressure). Each of these thresholds is defined by a compression state of a spring applied to a slide; in a first compression state, the spring applies a first force on the slide requiring that the pressure in the slide (in the example described below: in the first channel of the device) exceeds the pressure threshold Pb to set up the required fluid connection (in the example described below: between the first channel and the second channel); in a second compression state, the spring applies a force on the slide requiring that the pressure in the slide (in the example described below: in the first channel) exceeds the pressure threshold Ph to set up the required fluid connection (in the example described below: between the first channel and the second channel) (Ph>Pb). Means can be used to regulate (or to fix) these two pressure thresholds.

Figure 1:
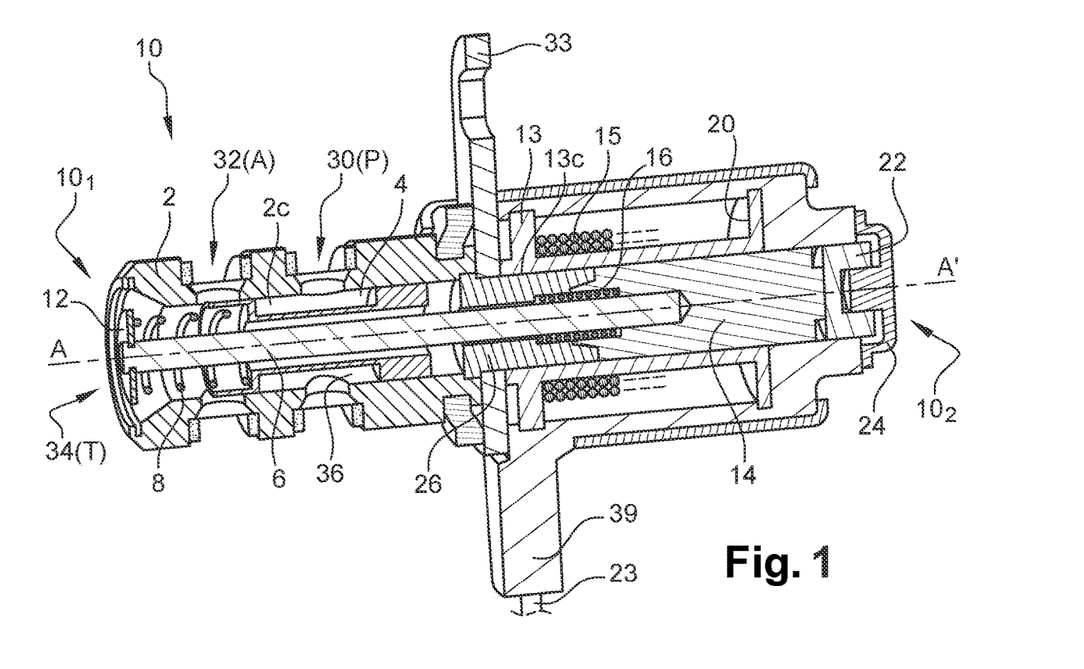
FIG. 1 represents a particular embodiment of a device according to the invention, for a solenoid generating a thrust movement when it is activated.

FIG. 1 shows one embodiment of a solenoid valve 10 according to the invention.

This embodiment relates to a solenoid valve in which the pressure threshold is active (or that activates the passage between a high pressure threshold and a low pressure threshold) making use of an electromagnetic actuator, for example an "ON/OFF" solenoid (in other words that operates between an active state and an inactive state); a thrust can be generated by activating the pressure threshold by the actuator.

The use of a solenoid will be described in the following, but the invention also covers the case in which other types of electromagnetic actuators are used.

The solenoid is used to select a pressure threshold (among at least one low pressure threshold and one high pressure threshold) or to activate the passage between the high pressure threshold and the low pressure threshold; but once the pressure threshold has been chosen, the slide movement then depends on the pressure of the fluid inlet into the valve, relative to said threshold.

In this example, the solenoid valve 10 extends longitudinally between a first end $10_1$ and a second end $10_2$, along an axis AA'.

It comprises a main body 2, that extends longitudinally along this axis AA'.

In the example shown, this body comprises lateral supply channels 30 (channel "P" or input channel), 32 (channel "A" or output channel); and an end supply channel 34 ("T" channel or vent). A fluid, for example oil, can circulate through these supply channels. Other geometries for the distribution of different channels can be made within the framework of the invention: for example channel P (input) can be at the end of the valve, while channels "T" and "A" are arranged laterally; as a variant, the channels "P" and "A" in FIGS. 1 and 6 can be inverted; as another variant, channel A (output) can be at the end, while channels "P" and "T" are arranged laterally. The following explanations are given for the configuration represented in FIG. 1, but the invention is also applicable to the other possible configurations, particularly those mentioned above.

The body 2 is hollow on the inside: it comprises an internal cylindrical cavity 2c in which a slide 4 can displace between 2 positions, in order to set up a fluid or hydraulic communication (which means that a fluid can then circulate), either between two lateral supply channels 30, 32, or between the lateral supply channel 32 and an end channel 34. In FIG. 1, the fluid communication between channels 30 and 32 is closed off, the fluid pressure being less than Pb (for example, all the channels are at atmospheric pressure).

The cylindrical cavity $2c$ is prolonged by another cylindrical cavity $13c$, delimited by a support casing 13, that also defines a compartment 20 that can hold a solenoid 15 arranged around this cavity $13c$. Supply means to this cavity are provided. When a current is supplied to the solenoid, a mobile core 14, that has magnetic properties to interact with the field generated when a current passes through the solenoid, is displaced inside this cavity $13c$.

A spring 8 is positioned between a stop 12, located at the first end $10_1$ of the device and the main body 2, on the side of the end channel 34, and a bearing surface of the slide 4. The stop leaves a passage around it for fluid to flow to the channel 34; for example, the end of the cylindrical cavity $2c$ can be prolonged by a conical shaped part, tapered outwards. The width or the diameter of the stop 12 can be limited to what is sufficient for bearing of the spring. The surfaces against which this spring bears are perpendicular or substantially perpendicular to the axis AA'. This spring applies a longitudinal force along this axis AA'. This spring pushes the slide towards the second end $10_2$. A fluid added into the valve counters this spring action to make the slide move between its 2 positions, when the pressure of this fluid becomes greater than the pressure applied by the spring on the slide.

Means are used to select the pressure applied by the spring 8 on the slide 4 between at least 2 different levels, Pb and Ph; depending on the values of Pb and Ph used, a fluid inlet into the valve can apply a contrary force to make the slide switch between its 2 positions, when the pressure in this fluid exceeds the pressures Pb and Ph respectively.

In the example represented, the slide 4 comprises a central cylindrical part 41 (see FIG. 2A), with outside diameter less than the diameter of the cylindrical cavity inside the main body 2. Thus, a chamber or internal cavity 36 is formed between the external surface of the slide 4 and the internal surface of the main body. This central cylindrical part 41 of the slide is prolonged by two end parts 42, 43, that are also substantially cylindrical with an outside diameter substantially equal to the inside diameter of the main body 2, in which they can be guided in translational displacement. One of these two end parts 42 can partially close one 32 of the valve supply channels. Longitudinally, the internal cavity 36 is delimited by end surfaces $42_1$ and $43_1$, of the end parts 42 and 43 respectively. In fact, the end parts 42, 43 can be such that the surface areas offered by these parts to a fluid that enters the cavity 36 are different from each other, the surface area of the end part 42 to which this fluid is applied being larger than the surface area of the end part 43, so as to facilitate displacement in the required direction (towards the left in FIG. 1).

For example, the slide may be in an initial position in which the fluid communication between channels 30 and 32 is closed off by the end part 42 of the slide, which is arranged so as to partially close off the channel 32, the cavity 36 facing the channel 30. As a variant, the end part 42 can be arranged between the channels 30 and 32, but this implies a longer movement distance of the slide to set up the communication between channels 30 and 32. A fluid communication is then set up between supply channels 32 and 34, between which a fluid inlet through the supply channel 32 can circulate. More generally, the valve alternatively sets up a fluid or hydraulic connection between channels 30 and 32 and then between channels 32 and 34, or vice versa. Even more generally, the valve can alternatively set up a fluid or hydraulic connection firstly between channels "P" and "A" and then between channels "A" and "T", or conversely, regardless of the distribution of channels "A" "P" and "T".

When a sufficiently high pressure P (higher than the pressure applied by the spring 8 on the slide 4) is applied by this fluid in this cavity 36 and therefore also on the slide 4, the slide can be displaced towards the left on FIG. 1, compressing the spring 8. This releases the fluid communication between the supply channels 30 and 32 and closes off fluid communication between supply channels 32 and 34. The fluid that enters the cavity 36 through the supply channel 30 can then circulate towards channel 32.

In the embodiment illustrated herein, a substantially cylindrical longitudinal needle 6 comprises a first end positioned on the side of the first end $10_1$ (or the end channel 34) and a second end inserted in the mobile core 14, which displaces under the action of the solenoid 15. This needle is fixed to the stop 12.

Figure 2A:
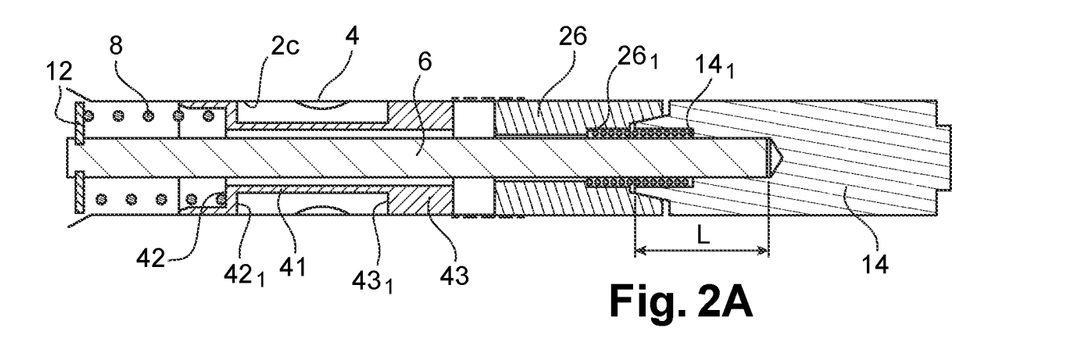
FIGS. 2A to 2C represent particular aspects of one embodiment of a device according to the invention.

The needle 6 passes through a fixed core 26 (inside which it can slide) and penetrates in the mobile core 14 inside which its second end is retained, over a length L (FIG. 2A). In other words along the axis AA' and starting from the first end $10_1$ and working towards the second end $10_2$ of the solenoid valve, there are the needle 6, the fixed core 26 through which the needle passes, then the mobile core 14 in which the needle is inserted, all in sequence. The larger the length L by which the needle is inserted into the mobile core, the more the spring 8 is compressed and the higher is one of the pressure thresholds (in this case the threshold Pb). In other words the low pressure Pb is regulated (or fixed) by inserting the needle 6 more or less deeply into the mobile core.

As a variant, in order to regulate the low pressure Pb, it is possible to apply a variable load or stress to the spring 8, more precisely at the end of the spring located on the side of the first end $10_1$ of the valve. This variable load or stress can be obtained by plastic deformation of a metallic element applied to the end of the spring, this element possibly being the stop 12. This variant is illustrated on FIG. 2C.

We will now describe regulation of the pressure threshold Ph.

Figure 2B:
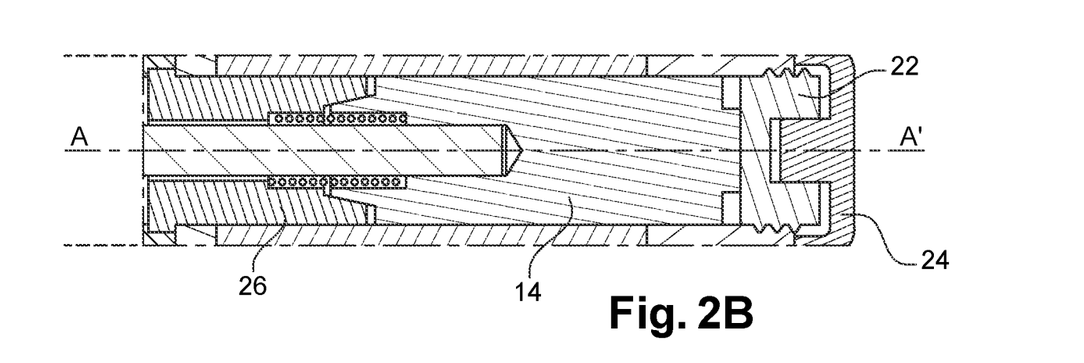
Figure 2C:
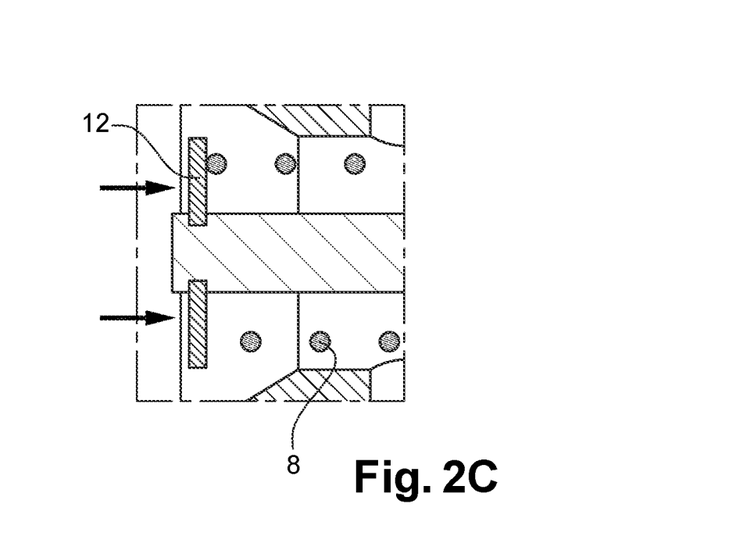

A spring 16 applies a pressure firstly on a surface $26_1$ of the fixed core 26, and secondly on a bearing surface $14_1$ of the mobile core 14 (FIGS. 2A, 2B). Each of these bearing surfaces is perpendicular or substantially perpendicular to the axis AA'. This spring 16 applies a longitudinal force along this axis AA', tending to push the mobile core towards the second end $10_2$. Inside the valve, the mobile core 14 is positioned between firstly the end of this spring 16 that bears on the bearing surface $14_1$, and secondly an end element 22 also called the plug, against which the mobile core applies pressure. The position of this end element 22 can be regulated, for example by screwing in a fixed part of the solenoid valve, for example in an insert moulded part 39 as illustrated on FIGS. 1 and 6.

This regulation is used to fix the value of the high pressure Ph.

In other words, the position of the mobile core 14 at rest (not activated by the solenoid) results from the position of the element 22 and the action of the spring 16. When the mobile element 14 is inserted more (or less) into the valve, the position of the needle 6 corresponding to the high pressure Ph is regulated (a position of the mobile core further into the valve at rest will reduce the pressure applied by the spring 8 on the slide). When the appropriate regulation has been made, the element 22 can be covered by a portion 24 forming a lid and that can be fixed to the fixed part of the solenoid valve (for example also the insert moulded part 39), such that the regulation obtained is not modified.

Thus, there is a first means of regulating (or fixing) the low pressure Pb, and a second means of regulating (or fixing) the high pressure Ph, these 2 means being independent of each other, even if the mobile core is used in these 2 means.

The mobile core 14 may be displaced in one direction or the other along the axis AA', by varying the current that supplies the solenoid, to more or less compress the spring 8 and thus select the pressure threshold (Ph or Pb) to be applied in the chamber 36 to displace the slide 4 and therefore to provide a fluid or hydraulic connection between the channels 30 and 32 or 32 and 34.

The length along which the mobile core is displaced is shorter than the length over which the mobile slide 4 is displaced for operation of the valve; the purpose of the displacement of the mobile core 14 is to vary the pressure to be applied in the cavity 36 to displace the slide 4, between the pressure called the "high" pressure Ph and the pressure called the "low" pressure Pb (in which Pb<Ph).

In other words:
- in a first operating state of the device (in the case shown in FIG. 1, this state is the state in which the solenoid is supplied by a current); the mobile core 14 is positioned such that the pressure P to be applied in the chamber 36 is equal to at least Pb to enable the fluid connection between channels 30 and 32 by displacement of the slide;
- in a second operating state of the device (in the case shown in FIG. 1, this state is the state in which the solenoid is not supplied by a current); the mobile core is positioned such that the pressure P to be applied in the chamber 36 is equal to at least Ph to enable the fluid connection between channels 30 and 32 by displacement of the slide.

The following gives an example of the operation of such a device.

When the solenoid is not supplied by a current, the pressure threshold is Ph. The pressure P of the fluid entering through the supply channel 30 acts on the slide 4 mechanically, tending to displace it contrary to the effect of the spring 8. When this pressure P becomes greater than Ph, the fluid or hydraulic connection between the channels 32 and 34, firstly open, is closed to be replaced by a fluid or hydraulic connection between channels 30 and 32.

When the solenoid is supplied by a current, the pressure threshold is Pb. The pressure P of the fluid entering through the supply channel 30 acts on the slide mechanically, tending to displace it contrary to the effect of the spring 8, reduced by the force resulting from displacement of the assembly composed of the mobile core 14, the needle and the stop. When the pressure P becomes greater than Pb (Pb<Ph), the fluid or hydraulic communication between the channels 32 and 34 is closed to be replaced by a fluid connection between supply channels 30 and 32.

As explained above, the regulation of the pressure Pb is the result of the more or less deep insertion of the assembly containing the needle 6 in the mobile core 14, then forming a rigid needle—stop—mobile core assembly.

The regulation of the pressure Ph results from the position of the mobile core (in the position not activated by the solenoid), making use of the more or less deep insertion of the element 22 that defines a fixed travel value of the mobile core.

In the different cases presented above, the states in which the solenoid is powered and is not powered by a current are associated with the thresholds Pb and Ph respectively.

The opposite would be true in the case presented below with reference to FIG. 6. This opposite case would also be the case of a solenoid valve operating on the same principle as that in FIG. 1, but with a slide moving from the left towards the right (on FIG. 1) under the effect of the pressure P that would be introduced in the channel 32, and not in the channel 30. Channel "A" would then be channel 30 and channel "T" would be channel 34, or at the bottom of the body, on the side of the solenoid.

Figure 6:
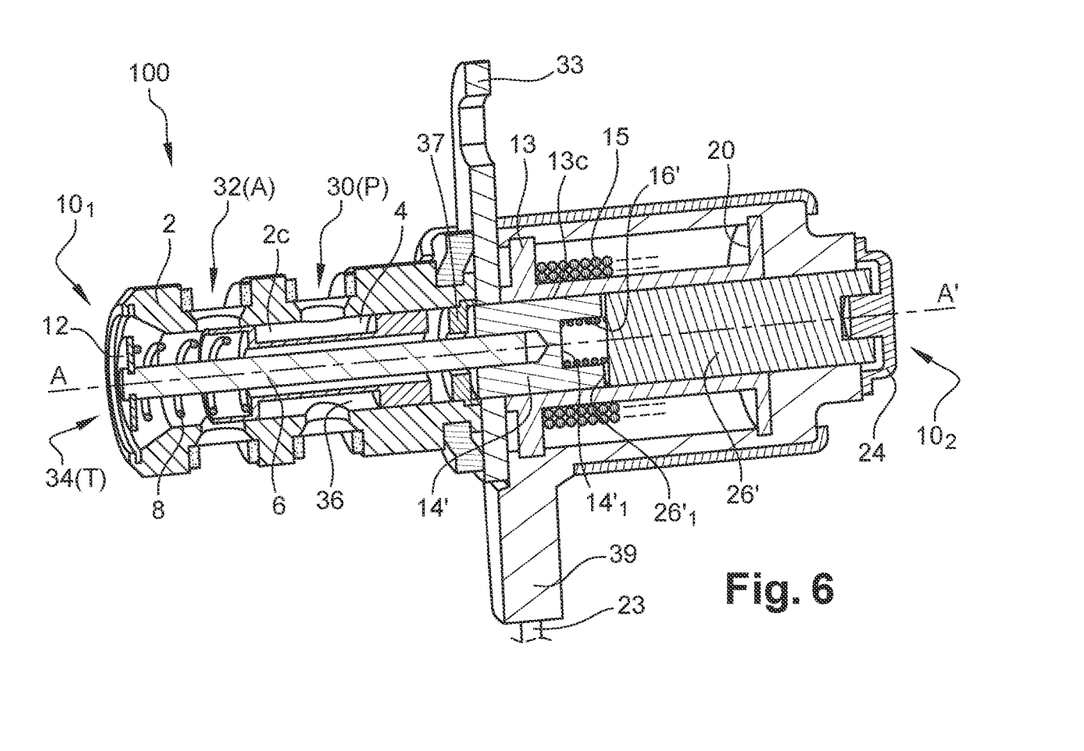
FIG. 6 represents another particular embodiment of a device according to the invention, for a solenoid generating a pulling movement when it is activated.

In FIGS. 1 and 6, references 23 and 33 designate electrical connection means (for example a cable) and an attachment tab respectively.

Figure 3:
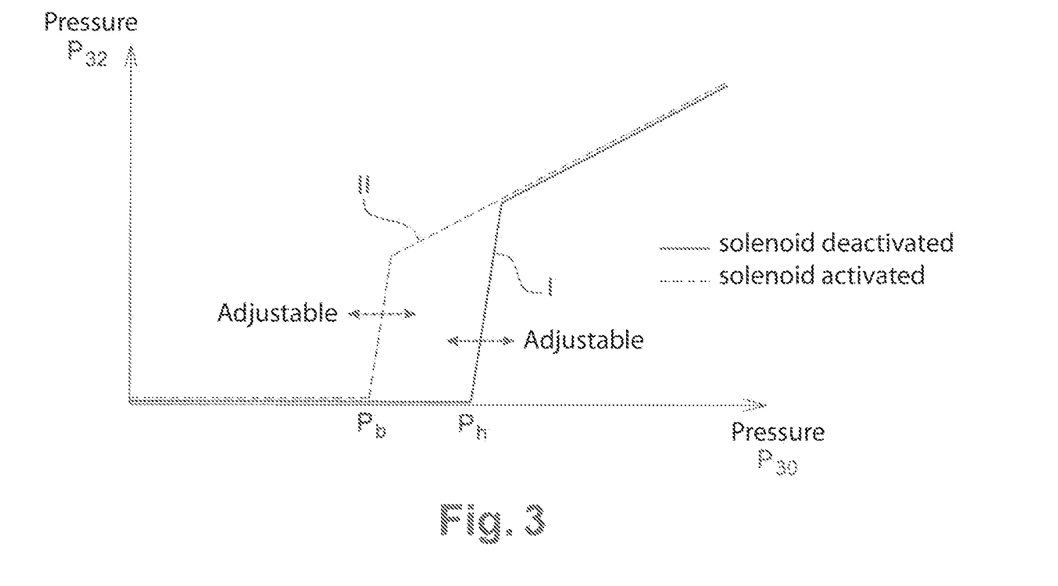
FIG. 3 represents a pressure variation diagram for one embodiment of a device according to the invention.

FIG. 3 illustrates the operation of a valve according to the invention, as described above. It represents the variation of the pressure $P_{32}$ in the supply channel 32 as a function of the pressure $P_{30}$ in the supply channel 30.

The pressure thresholds Pb and Ph (with the regulation ranges of each indicated by double arrows in discontinuous lines) are represented on the abscissas axis.

When the solenoid is not active (curve I), the threshold is defined by the pressure Ph. For a pressure in the supply channel 30 equal to less than this pressure Ph, the communication between the supply channels 30 and 32 is closed.

For a pressure in the supply channel 30 greater than this pressure Ph, the communication between the supply channels 30 and 32 is open; which explains the rising part of the curve I for P>Ph (the pressure in the supply channel 32 approaches the pressure in the supply channel 30).

When the solenoid is active (curve II), the threshold is defined by the pressure Pb. For a pressure in the supply channel 30 equal to less than this pressure Pb, the communication between the supply channels 30 and 32 is closed.

For a pressure in the supply channel 30 greater than this pressure Pb, the communication between the supply channels 30 and 32 is open; which explains the rising part of the curve II for P>Pb (once again, the pressure in the supply channel 32 is similar to the pressure in the supply channel 30).

FIGS. 4A-5B represent an application of a valve according to the invention, as described above, to a hydraulic pump 50, preferably a variable geometry pump such as a vane pump or a geared pump. The fluid used is then oil.

Figure 4A:
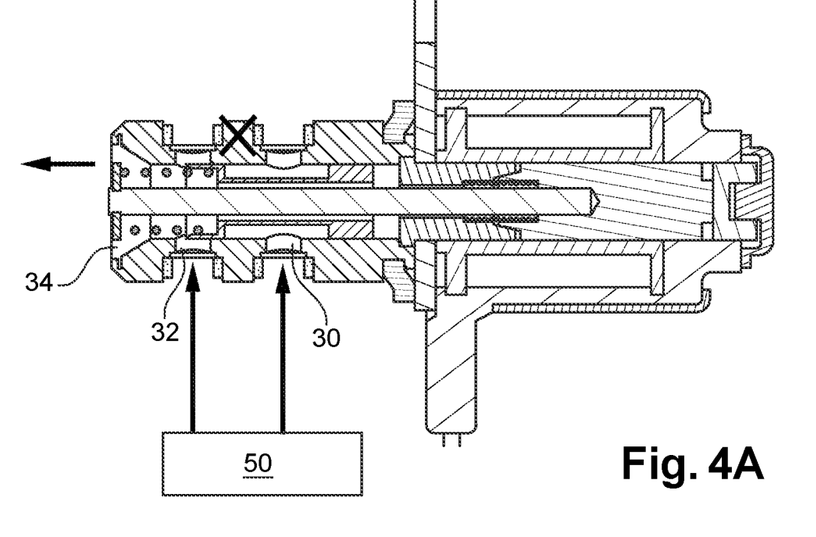
Figure 4B:
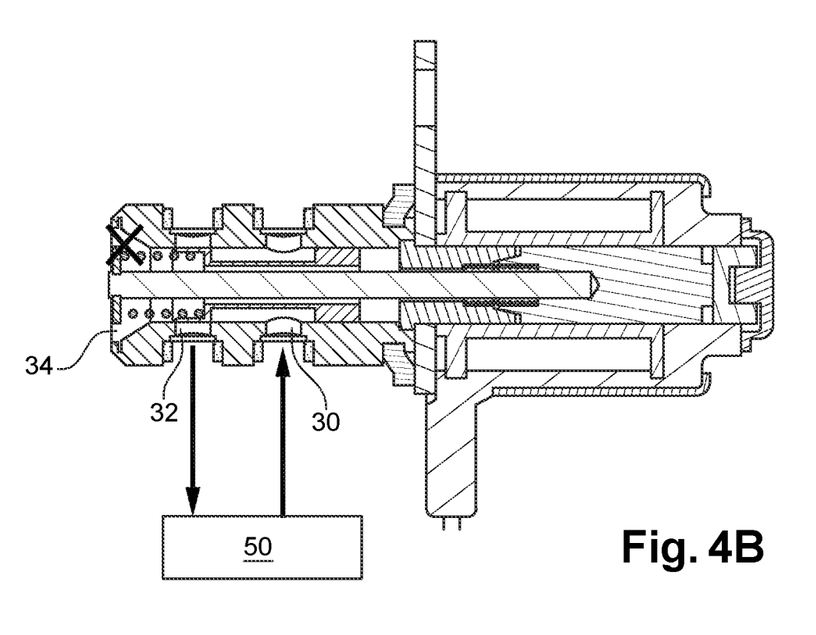

In a first state corresponding to FIG. 4A, no current is input into the solenoid and the pressure P inside the chamber 36 is less than the pressure threshold Ph. There is then no fluid or hydraulic communication between channels 30 and 32, both connected to the pump 50, but there is a fluid or hydraulic communication between channels 32 and 34 releasing the circulation of oil from a chamber (of the pump 50) connected to the channel 32, to channel 34.

In a second state corresponding to FIG. 4B, once again no current is input into the solenoid and the pressure P inside the chamber 36 is greater than the pressure threshold Ph. There is then fluid or hydraulic communication between channels 30 et 32, both connected to the pump 50, but there is no longer a fluid or hydraulic communication between channels 32 and 34. This then makes it possible to supply oil to the chamber, as mentioned above and connected to this channel 32.

Figure 5A:
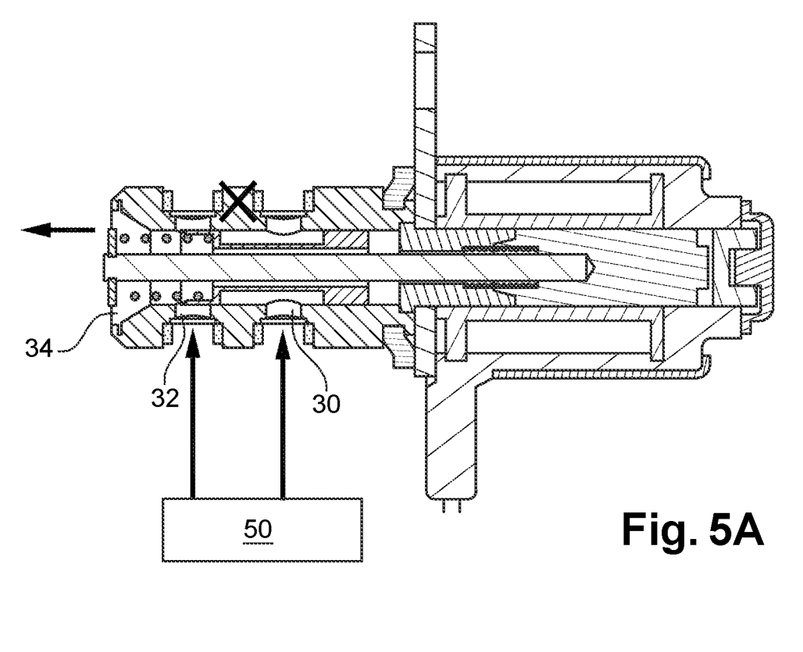

In a third state corresponding to FIG. 5A, current is input into the solenoid and the pressure P inside the chamber 36 is less than the pressure threshold Pb. There is then no fluid or hydraulic communication between channels 30 and 32, both connected to the pump 50, but there is a fluid or hydraulic communication between channels 32 and 34 releasing the circulation of oil from the chamber of the pump connected to the channel 32, to channel 34.

Figure 5B:
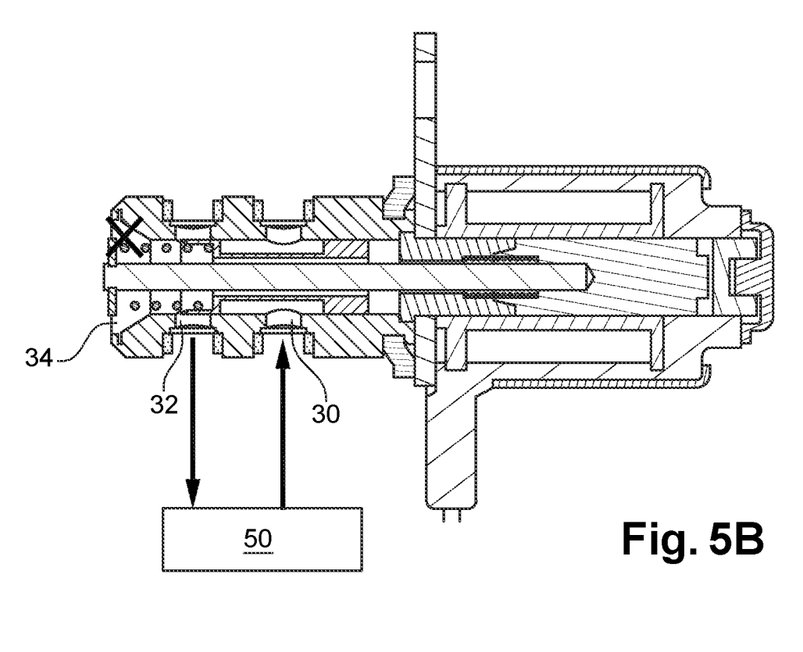

In a fourth state corresponding to FIG. 5B, current is still input into the solenoid and the pressure P inside the chamber 36 is greater than the pressure threshold Pb. There is then fluid or hydraulic communication between channels 30 et 32, both connected to the pump 50, but there is no longer a fluid or hydraulic communication between channels 32 and 34. This then makes it possible to supply oil to the chamber, as mentioned above and connected to this channel 32.

The different states described above can be obtained chronologically in the order described above, or in another order.

FIG. 6 shows another example embodiment of a solenoid valve 100 according to the invention.

Numeric references identical to those in the previous figures denote identical or corresponding technical elements.

This embodiment relates to a solenoid valve in which the pressure threshold is active (or that activates the passage between a low pressure threshold and a high pressure threshold) making use of an electromagnetic actuator, for example an "ON/OFF" solenoid (in other words that operates between an active state and an inactive state); a pulling force can be generated by activating the pressure threshold by the actuator.

In this embodiment, the presence of a washer 37 is noted that represents a movement stop of the mobile core, towards the left. This washer may or may not form a part of the main body.

In this embodiment, the needle 6 is held in place by its second end, in the mobile core 14' but it does not pass through the fixed core 26'. In other words along the axis AA', starting from the first end $10_1$ and working towards the second end $10_2$ of the solenoid valve, there are the needle 6, a mobile core 14' in which the needle is inserted over a certain length (to regulate the low pressure as before), then a fixed core 26', all in sequence.

The insertion length of the needle 6 in the mobile core 14' can fix the value of the low pressure Pb: as the inserted length of the needle in the mobile core increases, the spring 8 is increasingly compressed and one of the pressure thresholds (in this case the threshold Pb) increases. In other words the low pressure Pb is regulated (or fixed) by inserting the needle 6 more or less deeply into the mobile core.

As a variant, in order to regulate the low pressure Pb and as in the previous embodiment, it is possible to apply a variable load or stress to the spring 8, more precisely at the end of the spring on the side of the first end $10_1$ of the valve. This variable load or stress can be obtained by plastic deformation of a metallic element applied to the end of the spring, this element possibly being the stop 12. This variant is illustrated on FIG. 2C.

We will now describe regulation of the pressure threshold Ph.

A spring 16' applies a pressure firstly on a surface $26'_1$ of the fixed core 26', and secondly on a bearing surface $14'_1$ of the mobile core 14'. Each of these bearing surfaces is perpendicular or substantially perpendicular to the axis AA'. This spring applies a longitudinal force along this axis AA', tending to push the mobile core towards the first end $10_1$. Inside the valve, the spring 16' is positioned between firstly the support surface $14'_1$ and secondly the fixed core 26'. The position of this fixed core 26' can be regulated, for example by screwing in a fixed part of the solenoid valve, for example in an insert moulded part 39 as illustrated on FIG. 6.

This regulation is used to fix the value of the high pressure Ph.

In other words, the position of the mobile core 14' at rest (not activated by the solenoid) results from the position of the element 26' and the action of the spring 16': the high pressure Ph is regulated by inserting the mobile core 14' more or less deeply into the valve. When the appropriate regulation has been made, the element 26' can be covered by a portion 24 forming a lid and that can be fixed to the fixed part of the solenoid valve (for example also on the insert moulded part 39), such that the regulation obtained is not modified.

Thus, there is a first means of regulating (or fixing) the low pressure Pb, and a second means of regulating (or fixing) the high pressure Ph, these 2 means being independent of each other.

The mobile core 14' may be displaced in one direction or the other along the axis AA', by variation of the current that supplies the solenoid, to more or less compress the spring 8 and thus select the pressure threshold (Ph or Pb) to be applied in the chamber 36 to displace the slide 4.

The length along which the mobile core is displaced is shorter than the length over which the mobile slide 4 is displaced for operation of the valve; the purpose of the displacement of the mobile core 14' is to vary the pressure P to be applied in the cavity 36 to displace the slide 4, between the pressure called the "high" pressure Ph and the pressure called the "low" pressure Pb (in which Pb<Ph).

In other words:
  in a first operating state of the device (in the case shown in FIG. 6, this state is the state in which the solenoid 15 is supplied by a current), the mobile core 14' is positioned such that the pressure P to be applied in the chamber 36 is equal to at least Ph to enable the connection between channels 30 and 32 by displacement of the slide;
  in a second operating state of the device (in the case shown in FIG. 6, this state is the state in which the solenoid 15 is not supplied by a current); the mobile core 14' is positioned such that the pressure P to be applied in the chamber 36 is equal to at least Pb to enable the connection between channels 30 and 32 by displacement of the slide.

The following then gives an example of the operation of such a device.

When a current is supplied to the solenoid, the pressure of the fluid entering through the supply channel 30 acts on the slide 4 mechanically, tending to displace it contrary to the effect of the spring 8, increased by the force resulting from displacement of the assembly composed of the needle 6 and the mobile core 14'. The result is that when the pressure P increases, the initial fluid or hydraulic connection between the channels 32 and 34, is closed to be replaced by a fluid or hydraulic connection between channels 30 and 32. This occurs close to the pressure threshold Ph called the "high pressure" threshold.

When no current is supplied to the solenoid, the pressure of the fluid entering through the supply channel 30 acts on the slide mechanically, tending to displace it contrary to the effect of the spring 8. The result is that when the pressure P increases, the initial fluid or hydraulic communication between the channels 32 and 34, is closed to be replaced by a fluid or hydraulic connection between supply channels 30 and 32. This occurs close to the pressure threshold Pb, less than the threshold Ph.

The regulation of the pressure Pb is the result of the more or less deep insertion of the assembly containing the needle 6 in the mobile core 14', then forming a rigid needle—stop—mobile core assembly.

The regulation of the pressure Ph is the result of the more or less deep insertion of the fixed core 26' that will define a value of the fixed travel of the mobile core 14'.

Figure 7:
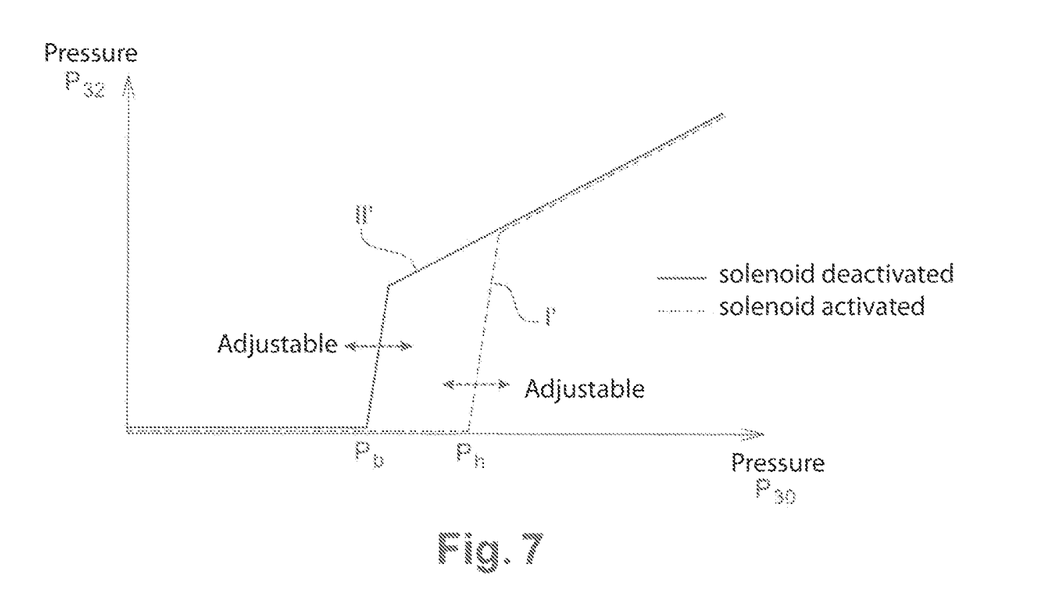
FIG. 7 represents a pressure variation diagram for one embodiment of the other particular embodiment of a device according to the invention, Similar or identical technical elements are designated by the same reference numbers in the figures.

FIG. 7 illustrates the operation of a valve according to the invention, as described above with reference to FIG. 6. It represents the variation of the pressure $P_{32}$ in the supply channel 32 as a function of the pressure $P_{30}$ in the supply channel 30.

The pressures Pb and Ph with the regulation ranges of each indicated by double arrows in discontinuous lines are represented on the abscissas axis.

When the solenoid is not active (curve II'), the threshold is defined by the pressure Pb. For a pressure in the supply channel 30 equal to less than this pressure Pb, the communication between the supply channels 30 and 32 is closed.

For a pressure in the supply channel 30 greater than this pressure Pb, the communication between the supply channels 30 and 32 is open; which explains the rising part of the curve II' for P>Pb (the pressure in the supply channel 32 is similar to the pressure in the supply channel 30).

When the solenoid is active (curve I'), the threshold is defined by the pressure Ph. For a pressure in the supply channel 30 equal to less than this pressure Ph, the communication between the supply channels 30 and 32 is closed.

For a pressure in the supply channel 30 greater than this pressure Ph, the communication between the supply channels 30 and 32 is open; which explains the rising part of the curve I' for P>Pb (once again, the pressure in the supply channel 32 is similar to the pressure in the supply channel 30).

A solenoid valve according to the embodiment described above with reference to FIGS. 6 and 7, can be applied to a hydraulic pump, preferably a variable geometry pump such as a vane pump or a geared pump. The fluid used is then oil. Schematics identical to or similar to those in FIGS. 4A-5B can be created with operation adapted to a valve generating a pulling movement during activation.

Regardless of the envisaged embodiment, it is possible to change from one threshold to another by modifying the current supplied to the solenoid, in one direction or the other.

Regardless of the envisaged embodiment, the objective is preferably to obtain a difference Ph—Pb between the two regulation pressure levels equal to between 1 bar and 7 bars, for example about 2 bars. Such pressure levels are suitable for an application to an oil pump for an automobile vehicle engine.

In the embodiments explained above, the solenoid is supplied by a constant voltage source to which is connected, for example through a switch or a relay.

As a variant, the solenoid may be proportionally controlled, thus making it possible to have a regulation by controlling several possible threshold levels between the low pressure threshold level Pb and the high pressure threshold level Ph. In this case, the supply to the solenoid makes use of an electrical control system (for example PWM) capable of generating a variable current. One or several levels between Pb and Ph can thus be defined, each corresponding to an intermediate position of the mobile core between the 2 positions corresponding to Pb and Ph. Its intermediate positions are reached with a current determined by the choice of the cyclic ratio applied to the PWM.

The invention claimed is:

1. A solenoid valve type device, with a slide mechanism reactive to pressure, the device comprising:
    a body comprising at least 3 liquid flow channels;
    means forming a slide that can be displaced in said body by a fluid under pressure, between a first position in which there is fluid communication between a first channel and a second channel among said 3 flow channels, and a second position in which there is fluid communication between said second channel and a $3^{rd}$ channel;
    means of selecting an activation pressure threshold for a displacement of said slide, among at least one first pressure threshold (Ph) and at least one second pressure threshold (Pb, in which Pb<Ph);
    means of regulating said at least one first pressure threshold (Ph) and said at least one second pressure threshold (Pb) for activation of said slide.

2. The device according to claim 1, comprising:
    a first spring, that tends to hold the slide in the first position;
    an electromagnetic actuator;
    a mobile core of the means of selecting an activation pressure threshold, the mobile core displaceable inside the device using said electromagnetic actuator between an inactive position and an active position, to select said activation pressure threshold of said slide.

3. The device according to claim 2, the means of regulating said at least one second pressure threshold (Pb) of said slide comprising means of regulating a longitudinal bearing force of the first spring on the slide.

4. The device according to claim 3, the means of regulating a longitudinal bearing force of the first spring on the slide comprising a stop against which the first spring bears, and a needle, inserted in the mobile core over a length L.

5. The device according to claim 4, the length L being adjustable and/or the stop being deformable.

6. The device according to claim 2, the means of regulating the at least one first pressure threshold (Ph) of said slide comprising means of regulating the inactive position of the mobile core inside the device.

7. The device according to claim 6, the means of regulating the inactive position of said mobile core comprising an element in adjustable bearing against said mobile core.

8. The device according to claim 7, comprising a fixed core and a second spring placed between the fixed core and the mobile core, wherein pressing the element on said mobile core compresses the second spring.

9. The device according to claim 7, said element in adjustable bearing against said mobile core comprising an end plug of the device, for which the adjustable bearing is regulated.

10. The device according to claim 9, wherein the bearing is regulated by screwing.

11. The device according to claim 7, comprising a fixed core and a second spring placed between the fixed core and the mobile core.

12. The device according to claim 11, wherein the fixed core and mobile core are regulated by screwing the fixed core onto the mobile core and compressing the second spring.

13. The device according to claim 2, also comprising a power supply to the electromagnetic actuator capable of generating a variable current.

14. The device according to claim 13, wherein the power supply is of the PWM type.

15. The device according to claim 1, in which the difference Ph—Pb between the at least one first pressure threshold and the at least one second pressure threshold is between 1 bar and 7 bars.

16. The device according to claim 1, wherein the device generates a thrust movement during activation or the device generates a pulling movement during activation.

17. Hydraulic A hydraulic circuit of a pump, comprising a pump and the solenoid valve type device according to claim 1.

18. The device of claim 17, wherein the pump is an oil pump.

19. A method of operating the solenoid valve type device according to claim 1, in which:
if the activation pressure threshold of said slide is the at least one first pressure threshold (Ph), the fluid is injected at a pressure P to displace said slide from the first position to the second position, the pressure P being greater than the at least one first pressure threshold (Ph);
if the activation pressure threshold of said slide is the second pressure threshold (Pb), the fluid is injected at a pressure P to displace said slide from the first position to the second position, the pressure P being greater than the at least one second pressure threshold (Pb), but less than the at least one first pressure threshold (Ph).

20. A method of operating a solenoid valve type device according to claim 2, in which:
if the activation pressure threshold of said slide is the at least one first pressure threshold (Ph), the mobile core is displaced inside the device using said electromagnetic actuator, to regulate the activation pressure to the at least one second pressure threshold (Pb) of said slide;
the fluid is injected at pressure P to displace said slide from the first position to the second position, the pressure P being greater than the at least one second pressure threshold (Pb), but less than the at least one first pressure threshold (Ph).

21. A method of operating a solenoid valve type device according to claim 2, in which:
if the activation pressure threshold of said slide is the at least one second pressure threshold (Pb), the mobile core is displaced inside the device using said electromagnetic actuator, to regulate the activation pressure to the at least one first activation pressure threshold (Ph) of said slide;
the fluid is injected at pressure P to displace said slide, from the first position to the second position, the pressure P being greater than the at least one first pressure threshold (Ph).

22. A solenoid valve type device, with a slide mechanism reactive to pressure, the device comprising:
a body comprising at least 3 liquid flow channels;
a slide that can be displaced in said body by a fluid under pressure, between a first position in which there is fluid communication between a first channel and a second channel among said 3 flow channels, and a second position in which there is fluid communication between said second channel and a $3^{rd}$ channel;
an electromagnetic actuator and a mobile core, that can be displaced inside the device using said electromagnetic actuator, between an inactive position and an active position, to select an activation pressure threshold for a displacement of said slide, among at least one first pressure threshold (Ph) and at least one second pressure threshold (Pb, in which Pb<Ph);
a first spring, that tends to hold the slide in the first position, a variable longitudinal bearing force of the first spring on the slide regulating said at least one second activation pressure threshold (Pb) of said slide, the at least one first activation pressure threshold (Ph) being regulated by an element in adjustable bearing against said mobile core.

23. The device according to claim 22, comprising a stop against which the first spring bears, and a needle, inserted in the mobile core over a length L, to regulate a longitudinal bearing force of the first spring on the slide.

24. The device according to claim 22, comprising at least one of:
a fixed core and a second spring placed between the fixed core and the mobile core, wherein pressing the element on said mobile core compresses the second spring; and
an end plug in adjustable bearing against said mobile core, for which the bearing is regulated;
a fixed core and a second spring placed between the fixed core and the mobile core.

25. The device according to claim 24, wherein when the device includes the end plug, the bearing is regulated by screwing.

26. The device according to claim 24, wherein when the second spring is placed between the fixed core and the mobile core, the fixed core, the second spring, and the mobile core are regulated by screwing the fixed core on the mobile core, compressing the second spring.

* * * * *